(12) United States Patent
Maxwell et al.

(10) Patent No.: US 7,195,044 B2
(45) Date of Patent: Mar. 27, 2007

(54) PNEUMATIC TIRE WITH TREAD INCLUDING BITING ELEMENTS

(75) Inventors: Paul Bryan Maxwell, Kent, OH (US); Sebastian Willy Fontaine, Burden (LU); Walter Dale Allen, Akron, OH (US); Daniel Ray Beha, Akron, OH (US); Brian David Digman, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 162 days.

(21) Appl. No.: 10/896,580

(22) Filed: Jul. 21, 2004

(65) Prior Publication Data

US 2006/0016536 A1   Jan. 26, 2006

(51) Int. Cl.
*B60C 11/04* (2006.01)
*B60C 11/11* (2006.01)
*B60C 11/13* (2006.01)

(52) U.S. Cl. .......................... 152/209.21; 152/209.22; 152/902; 152/DIG. 3

(58) Field of Classification Search ........... 152/209.21, 152/209.22, 902, DIG. 3
See application file for complete search history.

(56) References Cited

U.S. PATENT DOCUMENTS 3,727,661 A    4/1973  Hoke ................... 152/209
6,415,835 B1   7/2002  Heinen ................ 152/209.21
6,986,372 B2 * 1/2006  Below .................. 152/209.21
7,004,216 B2 * 2/2006  Godefroid ............. 152/209.22

FOREIGN PATENT DOCUMENTS

| CA | 2064405 | * | 10/1993 |
| EP | 1568514 |   | 8/2005 |
| GB | 460338 | * | 1/1937 |
| JP | 2003-273905 |   | 5/1991 |
| JP | 8-268010 | * | 10/1996 |
| JP | 2002-264614 | * | 9/2002 |
| JP | 2003-63213 |   | 5/2003 |
| WO | WO 95/18022 | * | 7/1995 |
| WO | WO 2004/048130 | * | 6/2004 |

* cited by examiner

*Primary Examiner*—Steven D. Maki
(74) *Attorney, Agent, or Firm*—Nancy T. Krawczyk

(57) ABSTRACT

A pneumatic tire with a tread has at least two axially adjacent tread elements, the elements being separated by a groove and each element having opposing lateral sides. Connecting the axially adjacent tread elements is at least one traction biting element. The biting element has three continuous portions. The first portion extends along the lateral side of the first tread element. The second portion extends through the separating groove. The third portion extends along the lateral side of the second tread element. Each biting element forms at least two distinct edges along the lateral sides of each tread element and two distinct edges in the separating grooves.

19 Claims, 7 Drawing Sheets

PNEUMATIC TIRE WITH TREAD INCLUDING BITING ELEMENTS

FIELD OF THE INVENTION

The present invention is directed towards a pneumatic tire. More specifically, the invention is directed toward a tread of a pneumatic tire wherein the tread elements forming the ground contact surface are provided with a series of biting teeth, thereby improving traction characteristics of the tire.

BACKGROUND OF THE INVENTION

The tread pattern of a tire provides a tire with adhesion, or traction, to the road, especially when the road is wet. This is accomplished by wiping the road with the discrete tread elements and by channeling the water through the grooves and sipes of the tread. This dual action permits the tread rubber to grip the road surface. A conventional tire will contain hundreds of drainage channels.

To assist in the traction characteristics of the tire, the tread elements forming the tread pattern are provided with a plurality of edges. However, the variation in the tread element configuration is limited and other means must be employed to improve traction. Other means include specific compounding of the tread rubber to improve traction and angling of the groove walls.

SUMMARY OF THE INVENTION

The present invention is directed toward a pneumatic tire wherein the tread elements are providing with a series of biting elements, creating a plurality of edges in the tread, to improve the traction characteristics of the tire.

BRIEF DESCRIPTION OF THE DRAWINGS

The invention will be described by way of example and with reference to the accompanying drawings in which.

DETAILED DESCRIPTION OF THE INVENTION

Figure 1:
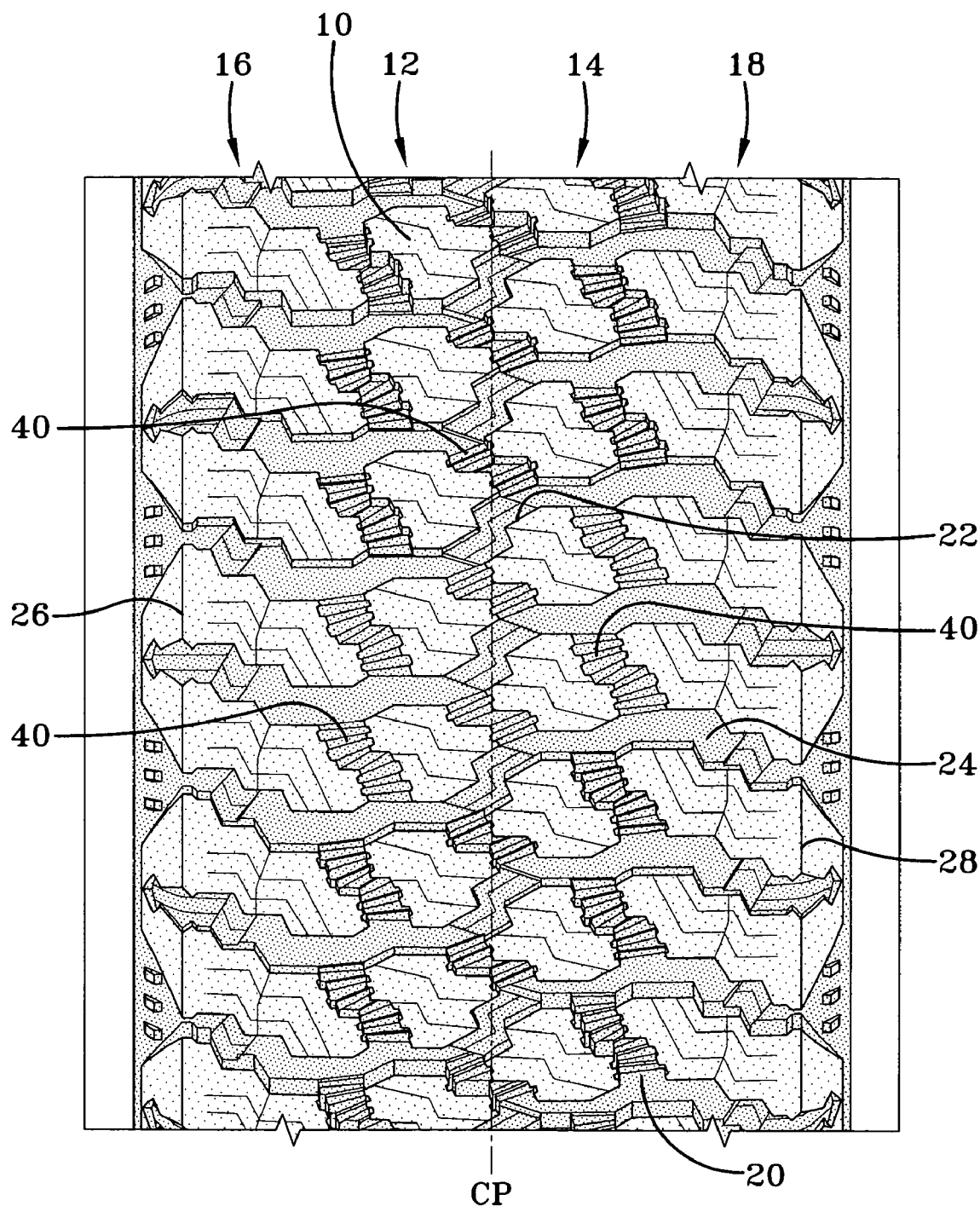
FIG. 1 illustrates a section of a pneumatic tire tread.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

A tread for a pneumatic tire is illustrated in FIG. 1. The tread is the ground engaging surface of the tire and is provided with a plurality of tread elements. Since the elements of the illustrated tread are individual elements, the present elements are conventionally referred to as tread blocks 10. In the present tread, the tread blocks 10 are divided into four circumferentially extending block rows, two center block rows 12, 14 and two tread edge block rows 16, 18. The center block rows 12, 14 are separated from the adjacent tread edge block rows 16, 18 by inclined circumferential grooves 20 and the two center block rows 12, 14 are separated from each other by inclined circumferential grooves 22. The tread blocks in each row 12, 14, 16, 18 are separated from the circumferentially adjacent tread blocks by a lateral groove 24 extending from one tread edge 26 to the opposing tread edge 28.

The inclined circumferential grooves 20, 22 separating axially adjacent blocks and the lateral grooves 24 define the four main sides of the tread blocks. Each tread center block 10 has two opposing lateral sides 30, 32, and a leading and trailing edge 34, 36; see FIG. 2. For the tread edge blocks, one of the opposing lateral sides of the tread blocks 10 is defined by the tread edge 26 or 28. In accordance with the present invention, there is at least one traction biting element 40 connecting axially adjacent tread blocks. The biting element 40 has a first portion 42 extending along one lateral side 30 or 32 of the tread block 10, a second portion 44 extending from the first portion 42 and through the groove 20, 22, or 24 separating the first tread element from an axially adjacent tread element, and a third portion 46 extending from the second portion 42 and up the lateral side 30 or 32 of the adjacent tread element.

Figure 2:
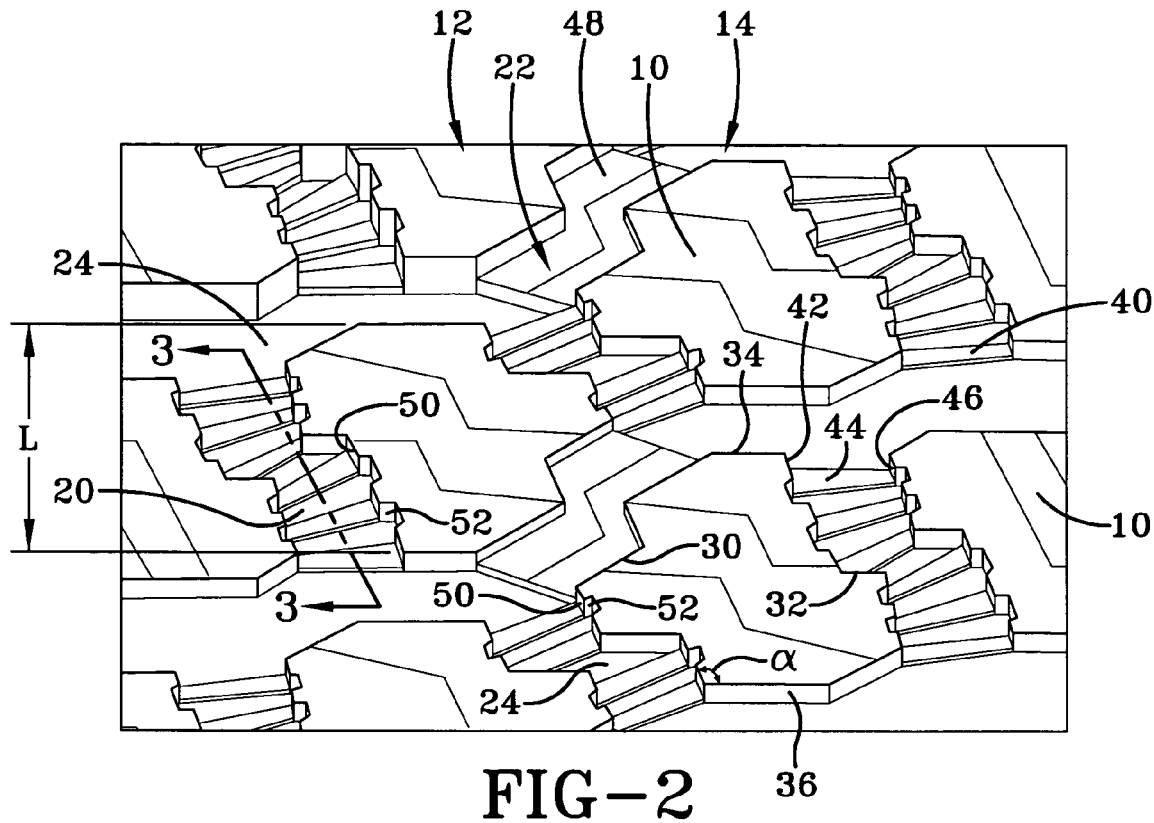
FIG. 2 is a close up view of a section of the tire tread of FIG. 1.

In the exemplary tread of FIGS. 1 and 2, the tread edge blocks have six biting elements 40 extending through the inclined circumferential groove 20 to connect with the laterally adjacent tread block. The tread blocks in the tread center block rows 12, 14 are connected via four biting elements 40 extending through the lateral groove 24, thereby connecting laterally adjacent and circumferentially offset tread blocks 10. The central tread blocks in the same lateral row, as defined by the lateral grooves 24, are connected via a tie bar 48; however, the tie bar 48 is not essential to the present invention and may or may not be included depending on the desired final tire characteristics.

Figure 3:
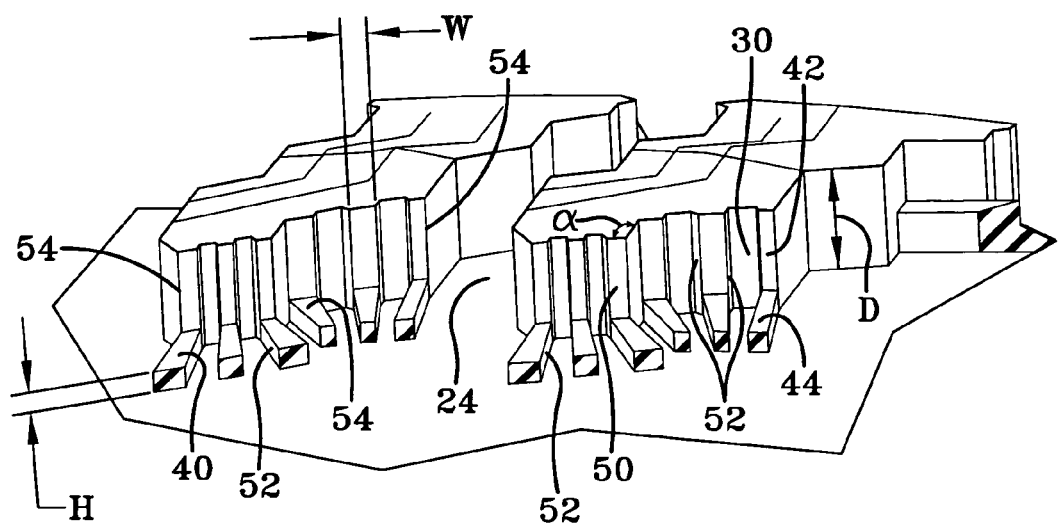
FIG. 3 is a side view of a tread block of FIG. 1.

Each of the illustrated biting elements 40 has at least three defined sides, see also FIG. 3. The primary side 50 is parallel to the lateral edge 30, 32 of the tread block 10. The sides 52 connecting with the primary side 50 either extend from a block edge 34, 36 or from the lateral side of the block 30, 32. The intersection of the primary side 50 and each connecting side 52 forms an included angle α of at least 90°. As the biting element 40 extends through the groove 20, 22, or 24, the three defined sides 50, 52 of the biting element 40 are maintained, and are mimicked along the lateral edge 32 or 30 of the adjacent connected tread block 10. A plurality of distinct edges 54 are created where the defined sides 50, 52 of the biting element 40 intersect or connect. The presence of the edges 54 created by the biting element 40, multiplied by the number of the biting elements 40 in the tread, increases the number of edges 54 in the tread, increasing the traction characteristics of the tread.

To prevent loss of other desired tread properties, such as water flow and noise, the dimensions of the biting element 40 are optimized. Each biting element primary side 50 has a width W, as measured across the width of the primary side along the lateral side 30, 32 of the tread block 10, of not more than 20% of the block's circumferential length L, preferably 5 to 15%, see FIG. 3. For ease of measurement, the block's circumferential length L is measured from the leading edge 34 of the block 10 to the trailing edge 36 of the block 10, along a line parallel to the tread centerplane CP. As an alternative design rule, the ratio of the total amount of block side length containing the biting element 40 (i.e. the sums of all the widths of all the primary sides 50) to the block's circumferential length L is in the range of 0.20 to 0.40; or 20 to 40% of the block's circumferential length is defined by biting elements.

In the grooves 20, 22, 24, the biting element 40 has a radial height H of not more than 20% of the groove depth D, the groove depth D being measured from the base of the groove 20, 22, or 24 to the radially outer surface of the tread blocks 10. Preferably, the height H of the biting element 10 is not more than 15% of the groove depth D. The extent of the projection of the biting element 40 from the side 30, 32 of the tread block 10 is approximately equal to the actual radial height H of the biting element 40 in the groove 20, 22, or 24.

Figure 4:
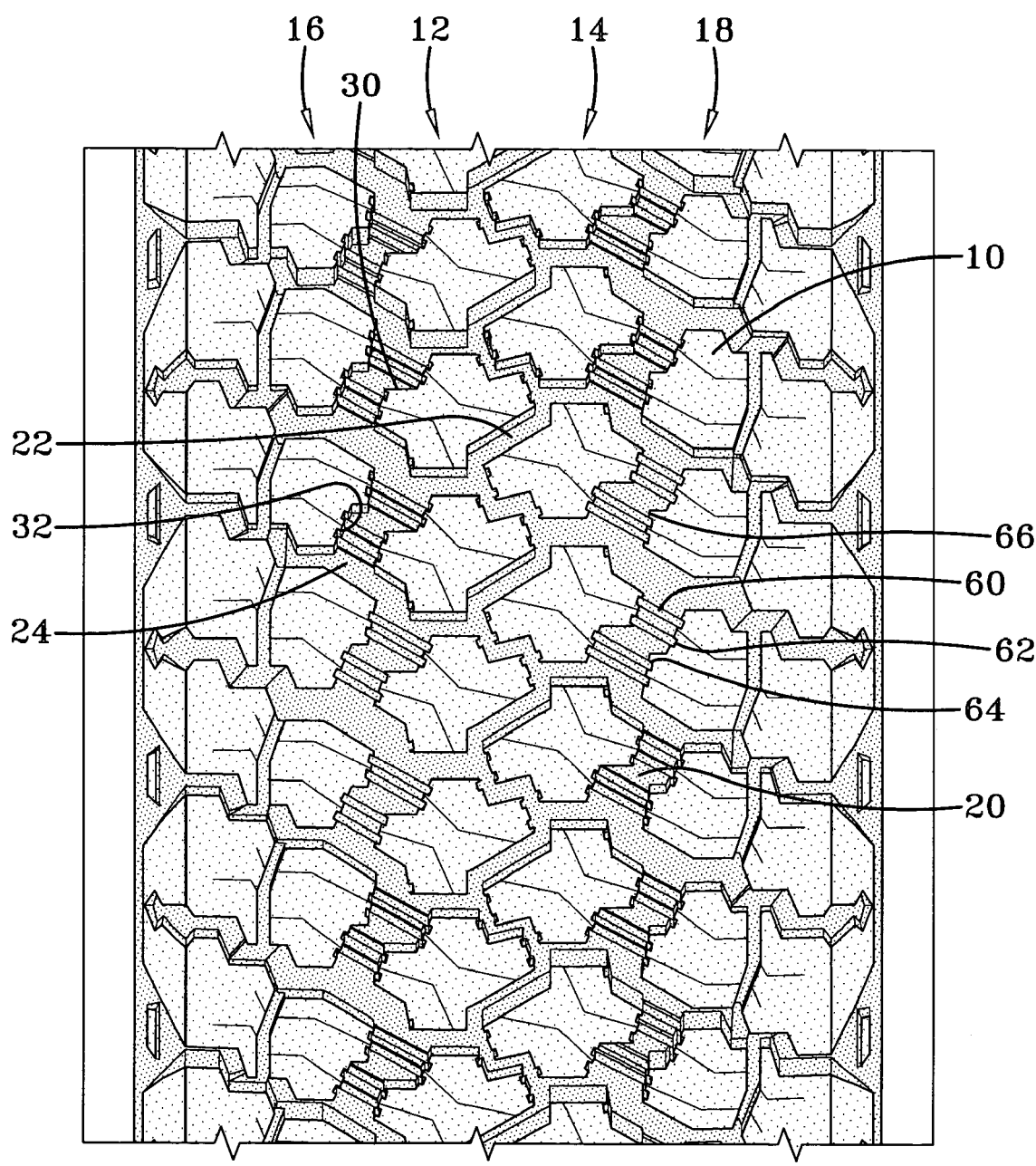
FIG. 4 is another embodiment of a tire tread.

In this discussed embodiment, the biting element 40, creating the multiple traction edges, initiates as a protrusion along the lateral edge 30, 32 of the block 10 and terminates as a protrusion along the lateral edge 32, 30 of the axially adjacent block 10. Another embodiment of the biting element is illustrated in FIG. 4. In the tread of FIG. 4, the biting element 60 initiates as an indentation along the lateral edge 30, 32 of the block 1—, extends above the groove base as it travels along the groove 20, and terminates as an indentation along the lateral edge of the axially adjacent block 32, 30. For the illustrated tread, the biting elements 60 are provided in the inclined, zigzag circumferential grooves 20 separating the tread edge block rows 16, 18 from the center tread block rows 12, 14. Four traction elements 60 connect the axially adjacent blocks 10.

Along the lateral edge 30, 32 of the blocks, the primary face 62 of the indentation of the biting element 60 has a width within the already described design rules for the primary face 50 of the biting element 40 of not more than 20%, preferably 5 to 15% of the circumferential block length L or the alternative design rule of the ratio of the total amount of block side length containing the biting element 40 to the block's circumferential length L is in the range of 0.20 to 0.40. The sides 64 of the indentation form an included angle with the block side of at least 90°. Due to rubber flow during molding, the primary face 62 of the indentation may appear to curve into the sides 64 of the indentations instead of forming a sharp angle of connection. This is acceptable, though a sharp angle of connection is preferred. The desired feature of the biting element 60—creating more traction edges in the tread configuration—is still achieved due to the distinct edges 66 created along the block wall by the intersection of the block wall and the indentation sides 64.

For this embodiment of the biting element 60, another design consideration may be the tire weight and minimizing any additional weight in the tread. For such concerns, to optimize the weight, the total volume of the tread block 10 displaced by the creation of the two indentation portions of the biting element 60 is approximately equivalent to the volume of the groove portion of the biting element 60.

Figure 5:
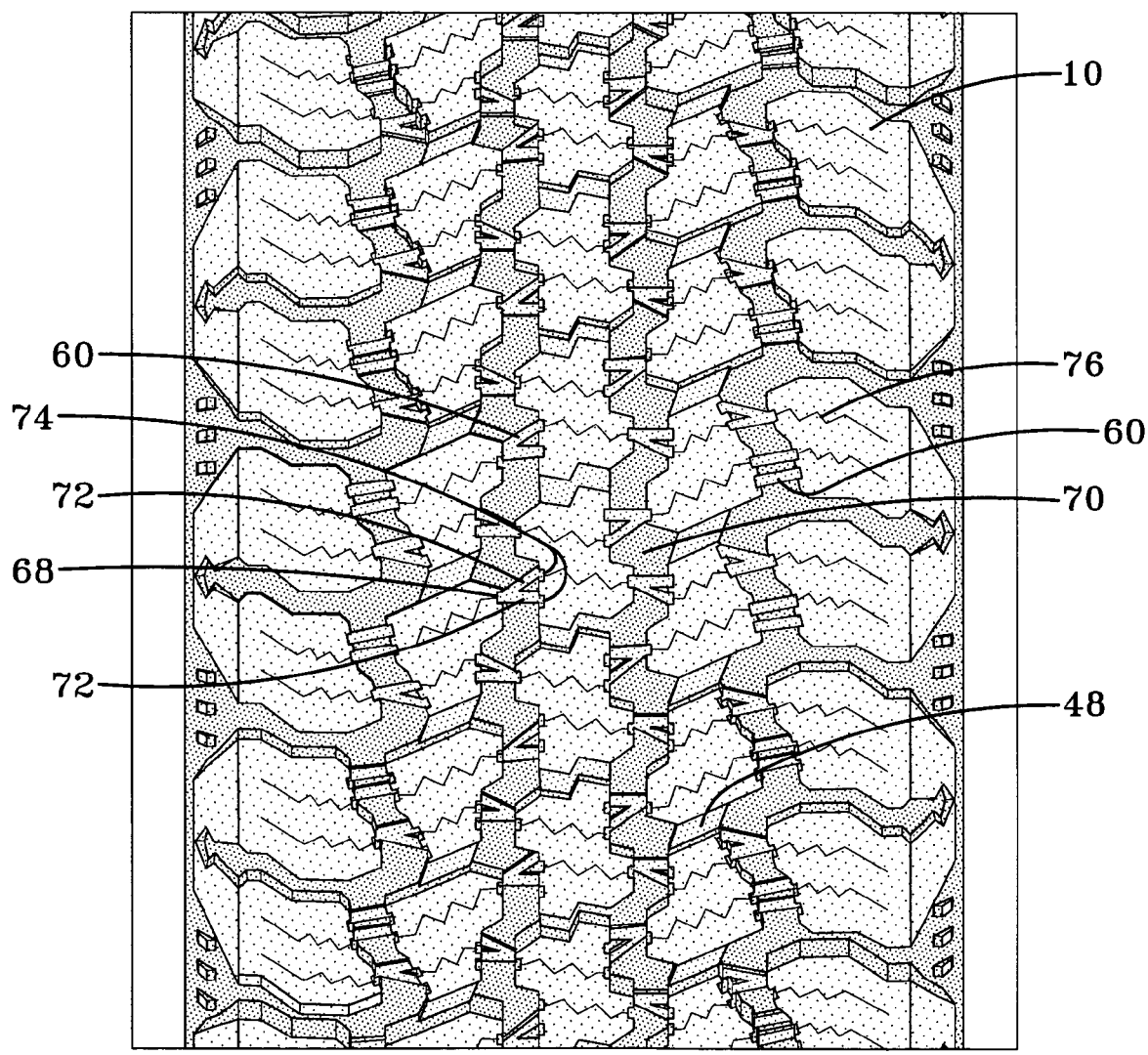
FIG. 5 is another embodiment of a tire tread.

FIG. 5 illustrates another embodiment of the invention. The biting elements 60 are similar to those of FIG. 4, wherein the portions along the lateral sides 30, 32 of the blocks 10 are indentations. Some of the biting elements 60 have a two-to-one correspondence in regards to the block edge portions of the biting element 60. For these biting elements 60, a single indentation 68 is present in one lateral wall 30, 32 of a tread block 10 and is connected to the axially adjacent tread block 10 through the groove 70 by means of a protrusion portion 66. Along the groove, the protrusion portion splits into two portions 72 and connects to two indentation portions 74 in the axially adjacent tread block 10. This two-to-one correspondence may also be used in forming the biting element 40 of FIG. 1 wherein the tread block portions of the biting element are protrusions.

Also seen in the tread of FIG. 5 is another aspect of the invention wherein, when the biting element 60 is formed by using indentations in the tread block sides 30, 32, the indentation location corresponds to the opening of a sipe or narrow groove 76 at the block edge 30, 32. This opens up the terminal end of the sipe or narrow groove 76, assisting in water or air expulsion from the sipe or narrow groove 76.

FIGS. 1, 4, and 5 illustrate the biting elements 40, 60 wherein the elements extend across circumferential grooves 20, 22, 70 between axially adjacent tread blocks 10, wherein the elements 40, 60 extend across lateral grooves 24 between circumferentially offset, axially adjacent tread blocks 10, and wherein 2 to 1 corresponding biting elements extend across circumferential grooves 70 to connect circumferentially offset, axially adjacent tread blocks 10. FIGS. 6–10 illustrate further various presentations of the biting elements 40, 60 with different tread element presentations, with the exact tread element configurations being simplified for understanding. One skilled in the art will readily appreciate that the illustrated tread elements may be provided with siping or narrow grooves, zigzag edges, inclined grooves, or other known variations in the configuration of the tread elements. Regardless of being illustrated as either the protrusion embodiment or the indentation embodiment of the biting element, both embodiments are applicable for the various tread presentations.

Figure 6:
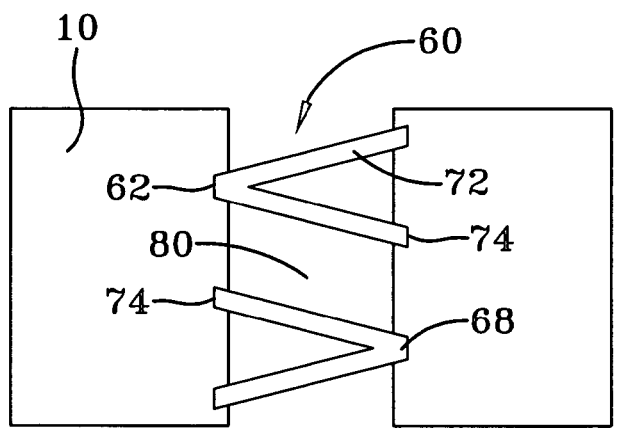
FIGS. 6–8 are simplified tread examples with the biting elements.
Figure 7:
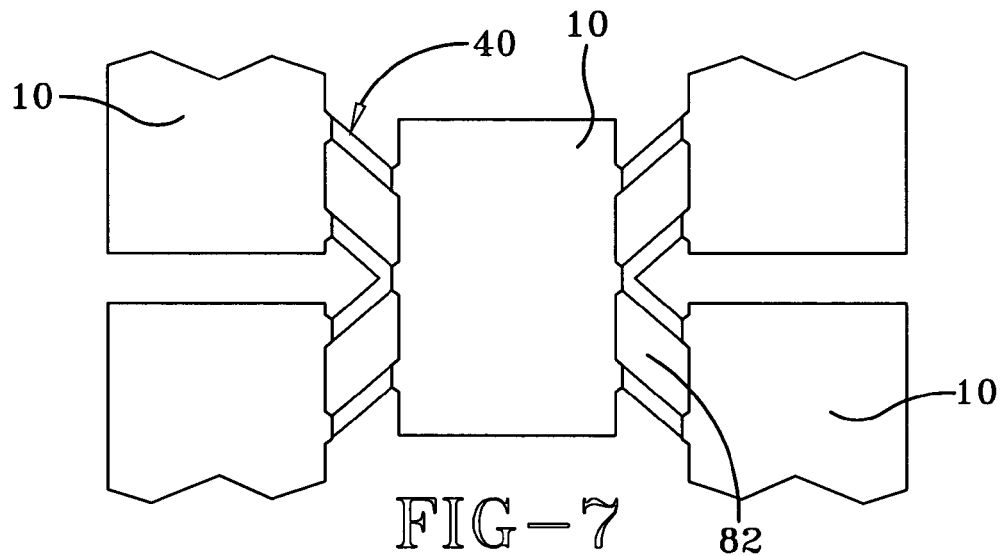
Figure 8:
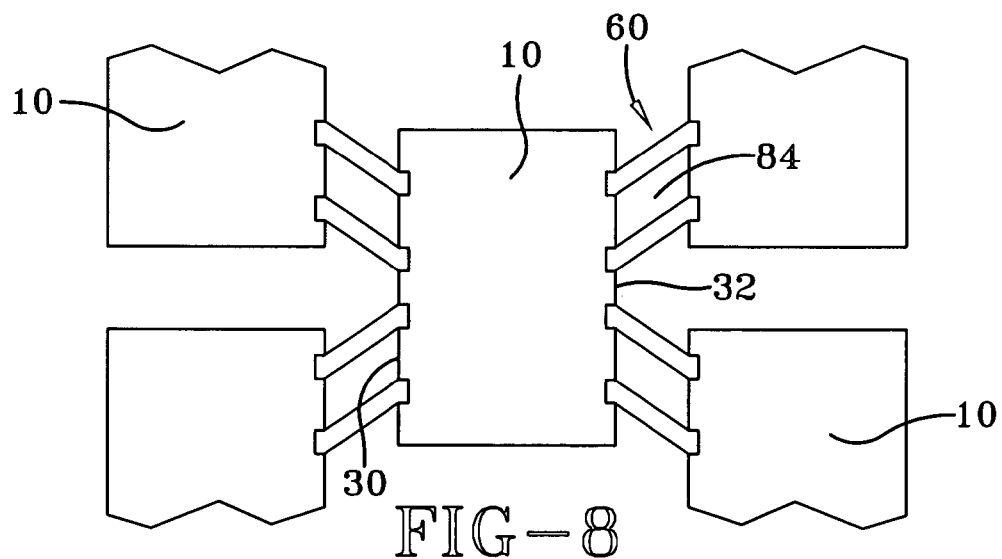

In FIG. 6, the biting elements 60 are 2 to 1 corresponding elements, the biting elements 60 extending across a circumferential groove 80 to connect two circumferentially aligned, axially adjacent tread blocks 10. In FIG. 7, there is a combination of one-to-one corresponding biting elements and two-to-one corresponding biting elements. The elements 40 extending across the grooves 82, connecting circumferentially offset, axially adjacent tread blocks 10. In FIG. 8, there are a plurality of one-to-one corresponding biting elements 60 connecting circumferentially offset, axially adjacent tread elements 10 across circumferential grooves 84; the center block being connected to two axially adjacent blocks on each lateral side 30, 32 of the center block 10.

Figure 9:
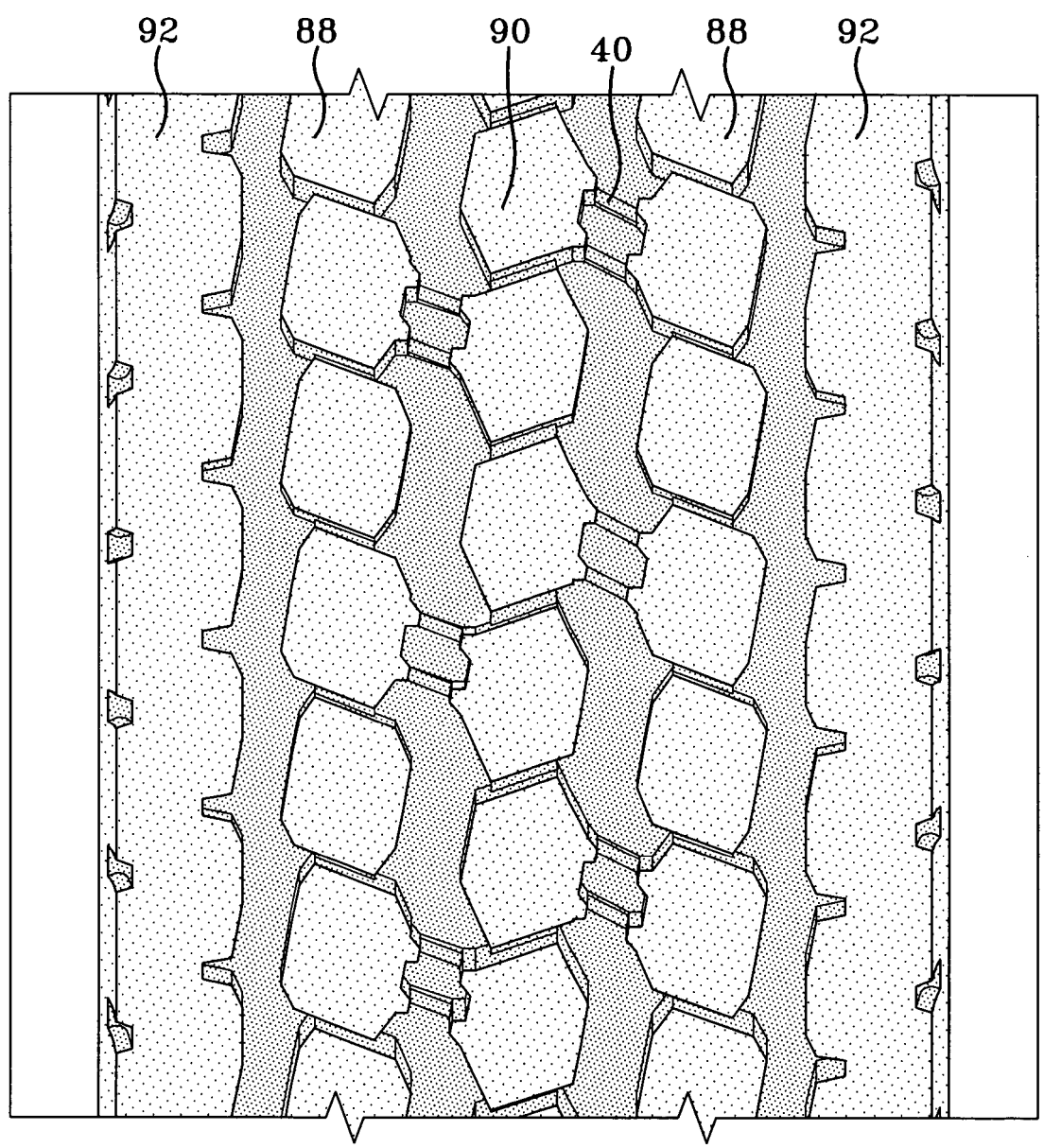
FIGS. 9–10 are ribbed treads with the biting elements.
Figure 10:
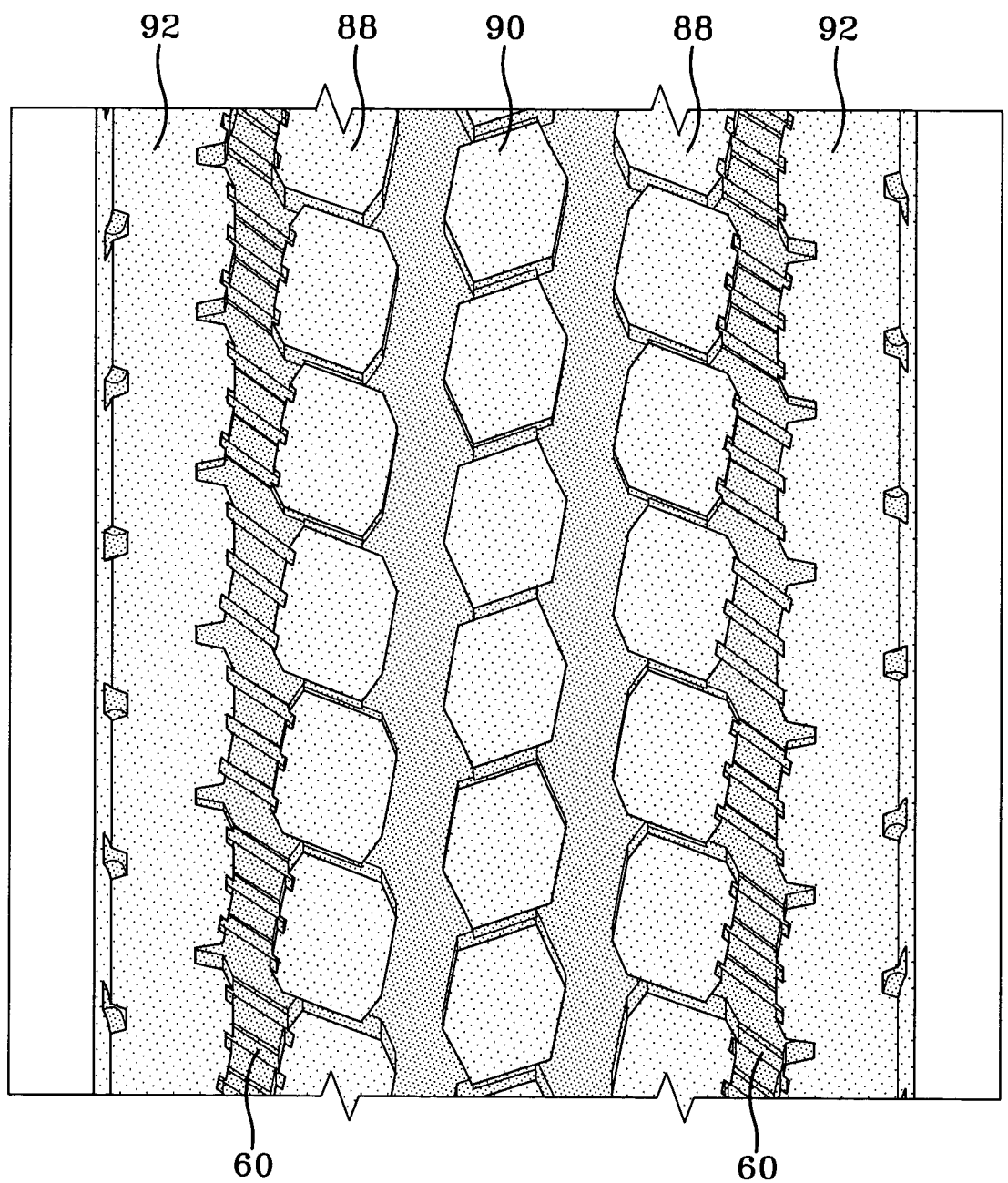

The biting elements 40, 60 may also be employed in a tread wherein the tread elements are ribs, see FIGS. 9 and 10. In the tread of FIG. 9, a series of biting elements 40 extend between the intermediate ribs 88 and the central rib 90. In the tread of FIG. 10, the biting elements 60 extend between the tread edge ribs 92 and the intermediate ribs 88. As with the previous treads having tread blocks 10, the biting elements 40, 60 can extend between any circumferential row of tread elements to connect axially adjacent elements. When formed in conjunction with tread blocks 10, the primary side 50, 62 of the biting elements 40, 60 have a width relative to the circumferential length of the block 10; when formed in conjunction with tread rows 88, 90, 92, the primary side 50, 62 of the biting elements 40, 60 have a width relative to the circumferential length of the tire tread. For a conventional passenger tire, the biting elements in a ribbed tire have a primary face width of not more than $1/125$ of the circumferential tire length. For a light truck tire, the width is not more than $1/200$ of the circumferential tire length.

For a commercial truck tire, the width is not more than ⅟₂₅₀ of the circumferential tire length.

In terms of actual length, whether for a ribbed tire tread or a block tire tread, the primary side 50, 62 of a biting element 40, 60 has a length, measured parallel to the primary side, in the range of 0.5 to 4.5 mm. The actual length chosen will be based upon the desired tire characteristics and the selected tire size. Even within a tread configuration, the actual lengths of the primary side 50, 62 of the biting elements 40, 60 may vary due to pitching of the tread features.

The biting elements 40, 60 of the present invention may be used in any type of tread configuration, with any type of tread element, and any combination of one-to-one corresponding biting elements, two-to-one corresponding biting elements, or a combination of both type of biting elements may be used. Additionally, the biting elements used in a tread configuration may either be of the protrusion type or the indentation type configuration, or a mix of protrusion type and indentation type biting elements may be used.

Because of the increased number of edges in the tread, the traction characteristics of the tread are improved, and the size of the biting element preserves other desired tire characteristics.

What is claimed is:

1. A pneumatic tire, the tire having a tread, the tread having an external ground engaging surface and having at least two axially adjacent tread elements, the elements being separated by a groove, the groove having a depth D as measured from a base of the groove to the tread surface, and each element having opposing lateral sides, the tread being characterized by
   at least one biting element connecting the axially adjacent tread elements, wherein the at least one biting element has a single first portion extending along the lateral side of the first element, a second portion extending through the separating groove wherein the second portion of the biting element is divided into two sections, and a third portion extending from each second portion section, each third portion extending along the lateral side of the adjacent tread element, and
   each portion of the at least one biting element forming at least two distinct edges along the lateral sides of each tread element and in the separating groove.

2. The tire of claim 1 wherein the portions of the biting elements that extend along the lateral sides of the tread elements protrude from the sides of the tread elements.

3. The tire of claim 1 wherein the portions of the biting elements that extend along the lateral sides of the tread elements are indented into the sides of the tread elements.

4. The tire of claim 1 wherein the portions of the biting elements that extend along the lateral sides of the tread elements have a primary side parallel to the lateral edge of the tread element, the primary side has a width of not more than 20% of the tread elements circumferential length as measured parallel to the tread centerplane.

5. The tire of claim 1 wherein the height of the second portion of the biting elements has a radial height of not more than 20% of the groove depth.

6. The tire of claim 1 wherein the tread elements are individual tread blocks separated by circumferential and lateral grooves.

7. The tire of claim 6 wherein the separating groove is a lateral or circumferential groove.

8. The tire of claim 1 wherein the axially adjacent tread elements are circumferentially offset.

9. The tire of claim 1 wherein the tread elements are circumferentially extending ribs separated by circumferential grooves.

10. A pneumatic tire, the tire having a tread, the tread having an external ground engaging surface and having at least two axially adjacent tread elements, the elements being separated by a segmented non-straight groove, the groove having a depth D as measured from a base of the groove to the tread surface, and each element having opposing lateral sides, the tread having
    at least two biting elements connecting the axially adjacent tread elements located in the same segment of the separating groove, wherein each of the at least two biting elements has a first portion extending along the lateral side of the first element, a second portion extending through the separating groove, and a third portion extending along the lateral side of the adjacent tread element,
    wherein at least the second portion of each of the at least two biting elements has a height H extending radially outward from the groove base, and the second portions of the at least two biting elements connecting adjacent tread elements are not parallel to one another; and
    each of the at least two biting elements forming at least two distinct edges along the lateral sides of each tread element and two distinct edges in the separating groove.

11. The tire of claim 10 wherein the separating groove is a lateral or circumferential groove.

12. The tire of claim 10 wherein the at least two biting elements connect a single tread element to multiple axially adjacent tread elements.

13. The tire of claim 10 wherein the portions of the biting elements that extend along the lateral sides of the tread elements protrude from the sides of the tread elements.

14. The tire of claim 10 wherein the portions of the biting elements that extend along the lateral sides of the tread elements have a primary side parallel to the lateral edge of the tread element, the primary side has a width of not more than 20% of the tread elements circumferential length as measured parallel to the tread centerplane.

15. The tire of claim 10 wherein the height of the second portion of the biting elements has a radial height of not more than 20% of the groove depth.

16. The tire of claim 10 wherein the portions of the biting elements that extend along the lateral sides of the tread elements are indented into the sides of the tread elements.

17. The tire of claim 10 wherein the tread elements are individual tread blocks separated by circumferential and lateral grooves.

18. The tire of claim 10 wherein the axially adjacent tread elements are circumferentially offset.

19. The tire of claim 10 wherein the tread elements are circumferentially extending ribs separated by circumferential grooves.

* * * * *